United States Patent
Le Pape et al.

(10) Patent No.: US 11,939,876 B2
(45) Date of Patent: Mar. 26, 2024

(54) GAS TURBINE ENGINE SENSOR SYSTEM WITH STATIC PRESSURE SENSORS

(71) Applicant: Pratt & Whitney Canada Corp., Longueuil (CA)

(72) Inventors: Damien Le Pape, Montreal (CA); Mark Cunningham, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/876,854

(22) Filed: Jul. 29, 2022

(65) Prior Publication Data

US 2024/0035393 A1    Feb. 1, 2024

(51) Int. Cl.
    *F01D 21/00*      (2006.01)

(52) U.S. Cl.
    CPC ...... *F01D 21/003* (2013.01); *F05D 2220/323* (2013.01); *F05D 2260/30* (2013.01); *F05D 2270/3011* (2013.01)

(58) Field of Classification Search
    CPC ........... F01D 21/003; F05D 2270/3011; F05D 2260/30; F02C 7/04
    See application file for complete search history.

(56) References Cited

U.S. PATENT DOCUMENTS

| | | | |
|---|---|---|---|
| 3,938,319 A | 2/1976 | Thomson | |
| 4,393,692 A * | 7/1983 | Clark | G01L 19/0007 73/112.01 |
| 4,414,807 A | 11/1983 | Kerr | |
| 4,872,807 A | 10/1989 | Thompson | |
| 5,433,114 A * | 7/1995 | Cook | G01L 19/0092 73/756 |
| 5,448,881 A * | 9/1995 | Patterson | F04D 27/02 701/100 |
| 11,073,090 B2 | 7/2021 | Nestico | |
| 2009/0246000 A1 | 10/2009 | Moore et al. | |
| 2010/0158074 A1* | 6/2010 | Fortier | G01L 19/0092 374/208 |
| 2017/0218854 A1 | 8/2017 | Nestico | |
| 2020/0070962 A1 | 3/2020 | Sidelkovskiy | |
| 2020/0080477 A1 | 3/2020 | Murphy | |
| 2021/0278192 A1 | 9/2021 | Stults | |
| 2022/0065126 A1* | 3/2022 | Lou | F04D 27/001 |
| 2022/0194617 A1* | 6/2022 | Iglewski | B01D 29/0018 |
| 2023/0175442 A1 | 6/2023 | Cloutier | |

FOREIGN PATENT DOCUMENTS

| KR | 101374356 B1 * | 3/2014 | ............ B64D 33/02 |
|---|---|---|---|
| KR | 101374356 B1 | 3/2014 | |

OTHER PUBLICATIONS

EP Search Report for EP Patent Application No. 23188787.8 dated Jan. 4, 2024.

* cited by examiner

*Primary Examiner* — Elton K Wong

(74) *Attorney, Agent, or Firm* — Getz Balich LLC

(57) ABSTRACT

A system is provided for an aircraft. This aircraft system includes a gas turbine engine and a sensor system. The gas turbine engine includes an inlet and a compressor section. A flowpath projects radially inward into the gas turbine engine from the inlet and extends through the compressor section. The sensor system includes a plurality of static pressure sensors at least partially within the flowpath. The sensor system is configured to determine a total pressure characteristic within the flowpath using the plurality of static pressure sensors.

19 Claims, 9 Drawing Sheets

GAS TURBINE ENGINE SENSOR SYSTEM WITH STATIC PRESSURE SENSORS

TECHNICAL FIELD

This disclosure relates generally to a gas turbine engine and, more particularly, to measuring total pressure within the gas turbine engine.

BACKGROUND INFORMATION

A sensor system may be arranged with a gas turbine engine during engine testing for measuring total pressure distortion upstream of a compressor. Various sensor systems and method for measuring total pressure distortion are known in the art. While these known sensor systems and method for measuring total pressure distortion have various benefits, there is still room in the art for improvement.

SUMMARY

According to an aspect of the present disclosure, a system is provided for an aircraft. This aircraft system includes a gas turbine engine and a sensor system. The gas turbine engine includes an inlet and a compressor section. A flowpath projects radially inward into the gas turbine engine from the inlet and extends through the compressor section. The sensor system includes a plurality of static pressure sensors at least partially within the flowpath. The sensor system is configured to determine a total pressure characteristic within the flowpath using the plurality of static pressure sensors.

According to another aspect of the present disclosure, another system is provided for an aircraft. This aircraft system includes a gas turbine engine, a screen and a sensor system. The gas turbine engine includes an inlet and a compressor section. A flowpath projects into the gas turbine engine from the inlet and extends through the compressor section. The screen extends across the flowpath at the inlet. The sensor system includes a plurality of static pressure sensors arranged with and upstream of the screen. The sensor system is configured to determine a total pressure characteristic within the flowpath using the static pressure sensors.

According to still another aspect of the present disclosure, a method provided for monitoring a gas turbine engine. During this monitoring method, a plurality of static pressure sensors are provided at least partially within a flowpath. The flowpath projects radially inward into the gas turbine engine from an inlet to the gas turbine engine. The flowpath extends through a compressor section of the gas turbine engine. A static pressure characteristic at a first location within the flowpath is determined using the static pressure sensors. A total pressure characteristic within the flowpath at a second location within the flowpath is determined based on the static pressure characteristic.

The pressure sensors may be arranged with a screen extending across the flowpath at the inlet.

The gas turbine engine may be configured as or otherwise include a turboshaft gas turbine engine or a turboprop gas turbine engine.

The total pressure characteristic may be indicative of a total pressure distortion across the flowpath.

The total pressure characteristic may be determined for a location at an upstream end of the compressor section.

The total pressure characteristic may be determined for a location at a face of a compressor rotor within the compressor section.

The sensor system is further configured to: determine a static pressure characteristic at a first location within the flowpath using the static pressure sensors; and process the static pressure characteristic to determine the total pressure characteristic at a second location within the flowpath that is downstream of the first location.

The static pressure characteristic may be indicative of a static pressure distortion across the flowpath at the first location. The total pressure characteristic may be indicative of the total pressure distortion across the flowpath at the second location.

The sensor system may be configured to process the static pressure characteristic using a correlation factor to determine the total pressure characteristic.

The first location may be at the inlet. The second location may be at the compressor section.

The static pressure sensors may be located along a screen across the flowpath.

A first of the static pressure sensors may include a pressure port with an inlet opening that faces radially inwards and away from incoming flow.

The sensor system may include a sensor mount with a downstream bluff end. One or more of the static pressure sensors may be attached to the sensor mount at the downstream bluff end.

The sensor mount may extend laterally between a first side and a second side. The first side may meet the downstream bluff end at a first corner. The second side may meet the downstream bluff end at a second corner.

The downstream bluff end may be configured with a straight sectional geometry.

Each of the one or more of the static pressure sensors may be recessed into the sensor mount from the downstream bluff end.

The static pressure sensors may be arranged in a symmetric pattern within the flowpath.

The static pressure sensors may be arranged in an asymmetric pattern within the flowpath.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
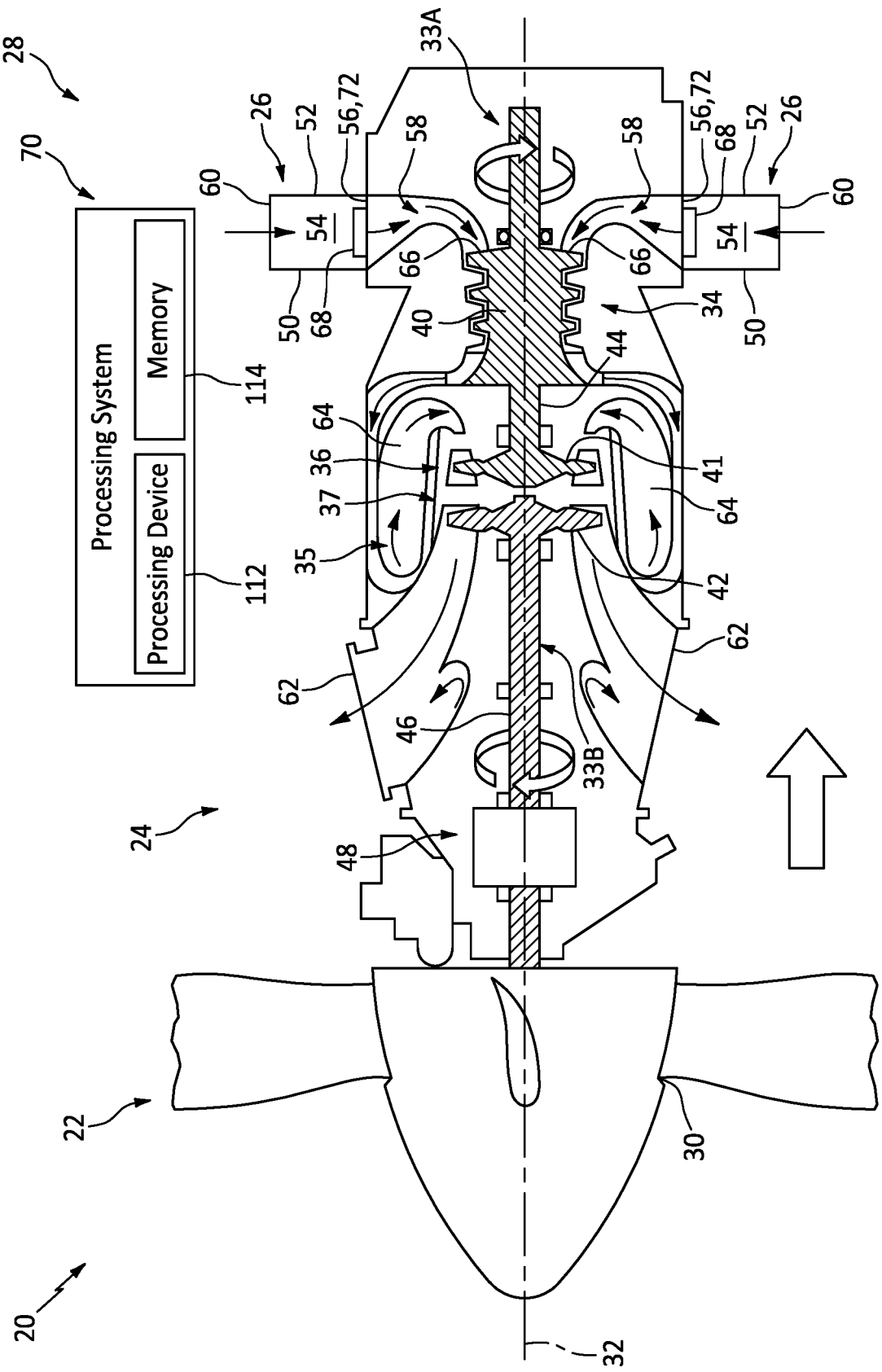
FIG. 1 is a side schematic illustration of an aircraft system.

FIG. 1 illustrates a system 20 for an aircraft. This aircraft may be configured as an airplane, a helicopter, a drone (e.g., an unmanned aerial vehicle (UAV)) or any other manned or unmanned aerial vehicle. The aircraft system 20 of FIG. 1 includes a mechanical load 22 and a gas turbine engine 24 for powering the mechanical load 22. The aircraft system 20 also includes an (e.g., annular) airflow inlet structure 26 and a sensor system 28.

The mechanical load 22 includes at least (or only) one rotor 30 operable to be rotatably driven by the gas turbine engine 24. This mechanical load 22 may be configured as a propulsor for propelling the aircraft during flight. The driven rotor 30, for example, may be a bladed propulsor rotor. An example of the propulsor rotor is a propeller where the gas turbine engine 24 is a turboprop gas turbine engine. Another example of the propulsor rotor is a helicopter rotor (e.g., a main rotor) where the gas turbine engine 24 is a turboshaft gas turbine engine. The mechanical load 22, however, may alternatively be configured as an electrical power generator. The driven rotor 30, for example, may be a generator rotor where the gas turbine engine 24 is an auxiliary power unit (APU). The present disclosure, however, is not limited to the foregoing exemplary driven rotor types nor the foregoing exemplary gas turbine engine types.

The gas turbine engine 24 extends axially along a centerline axis 32, which centerline axis 32 may also be a rotational axis for one or more rotating structures 33 (e.g., 33A and 33B) of the gas turbine engine 24. The gas turbine engine 24 of FIG. 1 includes a compressor section 34, a combustor section 35, a high pressure turbine (HPT) section 36 and a low pressure turbine (LPT) section 37, which LPT section 37 of FIG. 1 may also be referred to as a power turbine (PT) section and/or a free turbine section.

The compressor section 34 includes a bladed compressor rotor 40. The HPT section 36 includes a bladed high pressure turbine (HPT) rotor 41. The LPT section 37 includes a bladed low pressure turbine (LPT) rotor 42, which LPT rotor 42 of FIG. 1 may also be referred to as a power turbine (PT) rotor and/or a free turbine rotor. Each of these turbine engine rotors 40-42 includes a plurality of rotor blades arranged circumferentially around and connected to one or more respective rotor disks or hubs.

The compressor rotor 40 is connected to the HPT rotor 41 through a high speed shaft 44. The compressor rotor 40, the HPT rotor 41 and the high speed shaft 44 may collectively form or may otherwise be a part of the high speed rotating structure 33A; e.g., a high speed spool. The LPT rotor 42 is connected to a low speed shaft 46. The LPT rotor 42 and the low speed shaft 46 may collectively form or may otherwise be a part of the low speed rotating structure 33B. This low speed rotating structure 33B of FIG. 1 is coupled to the driven rotor 30 through a geartrain 48; e.g., an epicyclic geartrain. However, in other embodiments, the driven rotor 30 may be part of the low speed rotating structure 33B where, for example, the low speed shaft 46 connects the LPT rotor 42 to the driven rotor 30 without the geartrain 48.

The inlet structure 26 is configured to direct air into the gas turbine engine 24. This inlet structure 26 may be configured as a standalone structure. Alternatively, the inlet structure 26 may be configured as a part of a housing structure for the gas turbine engine 24 and/or other one or more components of the aircraft.

The inlet structure 26 of FIG. 1 includes a (e.g., annular) first wall 50 and a (e.g., annular) second wall 52. Each of these inlet structure walls 50 and 52 extends circumferentially about (e.g., completely around) the gas turbine engine 24. The first wall 50 is spaced axially along the centerline axis 32 from the second wall 52, thereby providing the inlet structure 26 with an inlet plenum 54; e.g., an internal volume such as an annular cavity. This inlet plenum 54 extends axially along the centerline axis 32 within the inlet structure 26 between and to the first wall 50 and the second wall 52. The inlet plenum 54 extend radially inward (relative to the centerline axis 32) within the inlet structure 26 to the gas turbine engine 24 and, more particularly, an inlet 56 to the gas turbine engine 24. This engine inlet 56 may be an opening (e.g., an annular orifice) in an outer case of the gas turbine engine 24 which houses the compressor section 34, the combustor section 35, the HPT section 36 and the LPT section 37.

During gas turbine engine operation, (e.g., fresh, ambient) air from outside of the aircraft enters a flowpath 58 of the aircraft system 20 through an airflow inlet 60. An upstream portion of the flowpath 58 may be formed within and extend through the inlet structure 26. The flowpath 58 of FIG. 1, for example, extends from the airflow inlet 60 radially inward towards the centerline axis 32, through the inlet plenum 54, to the engine inlet 56. A downstream portion of the flowpath 58 may be formed within and extend through the gas turbine engine 24. The flowpath 58 of FIG. 1, for example, projects radially inward into the gas turbine engine 24 from the engine inlet 56. The flowpath 58 subsequently extends from the engine inlet 56 sequentially through the compressor section 34, the combustor section 35, the HPT section 36 and the LPT section 37 to a combustion products exhaust 62.

The flowpath 58 directs the air in a radial inward direction towards the centerline axis 32 through the inlet plenum 54 and the engine inlet 56 into the gas turbine engine 24. Within the gas turbine engine 24, the air is compressed by the compressor rotor 40 and directed into a (e.g., annular) combustion chamber 64 of a combustor in the combustor section 35. Fuel is injected into the combustion chamber 64 and mixed with the compressed air to provide a fuel-air mixture. This fuel-air mixture is ignited and combustion products thereof flow through and sequentially cause the HPT rotor 41 and the LPT rotor 42 to rotate before being exhausted form the gas turbine engine 24 through the combustion products exhaust 62. The rotation of the HPT rotor 41 drives rotation of the compressor rotor 40 and, thus, compression of the air received through the inlet plenum 54 and the engine inlet 56. The rotation of the LPT rotor 42 drives rotation of the driven rotor 30. Where the driven rotor 30 is a propulsor rotor such as the propeller shown in FIG. 1, the rotation of the driven rotor 30 propels air outside of the gas turbine engine 24 in an aft direction along the centerline axis 32 to provide forward aircraft flight. Where the driven rotor 30 is the generator rotor, the rotation of the driven rotor 30 drives the electrical power generator to generate electrical power.

The air entering the gas turbine engine 24 through the engine inlet 56 and/or flowing to the compressor section 34 and an upstream face 66 of its compressor rotor 40 may be subject to a flow distortion; e.g., an uneven distribution of total pressure of the air about the centerline axis 32. For example, a local total pressure of the air at a first circumferentially position about the centerline axis 32 at the compressor rotor face 66 may be different than a local total pressure of the air at a second circumferentially position about the centerline axis 32 at the compressor rotor face 66. When distortions to the inlet flow at the compressor rotor face 66 are relatively low or the inlet flow is uniform, the gas turbine engine 24 and its compressor section 34 may operate relatively efficiently and without flow distortion related disruptions. When the distortions to the inlet flow at the compressor rotor face 66 are relatively high, the gas turbine engine 24 and its compressor section 34 may operate relatively inefficiently. The compressor section 34 may also be subject to flow distortion related disruptions such as compressor stall and/or compressor surge.

The sensor system 28 of FIG. 1 is provided with the gas turbine engine 24 to determine and/or map one or more characteristics of the air entering the gas turbine engine 24 through the engine inlet 56 and/or flowing to the compressor section 34 and its compressor rotor face 66. This determination/mapping may be performed to facilitate tuning and/or setting performance parameters for the gas turbine engine 24. The sensor system 28, for example, may be arranged with the gas turbine engine 24 during gas turbine engine testing, where the gas turbine engine 24 may be in a real world environment on the aircraft while the aircraft is on ground or alternatively where the gas turbine engine 24 is in a controlled test cell environment. However, it is also contemplated the sensor system 28 may be configured with the gas turbine engine 24 during, for example, aircraft flight tests. This sensor system 28 of FIG. 1 includes one or more sensor assemblies 68 and a processing system 70.

Figure 2:
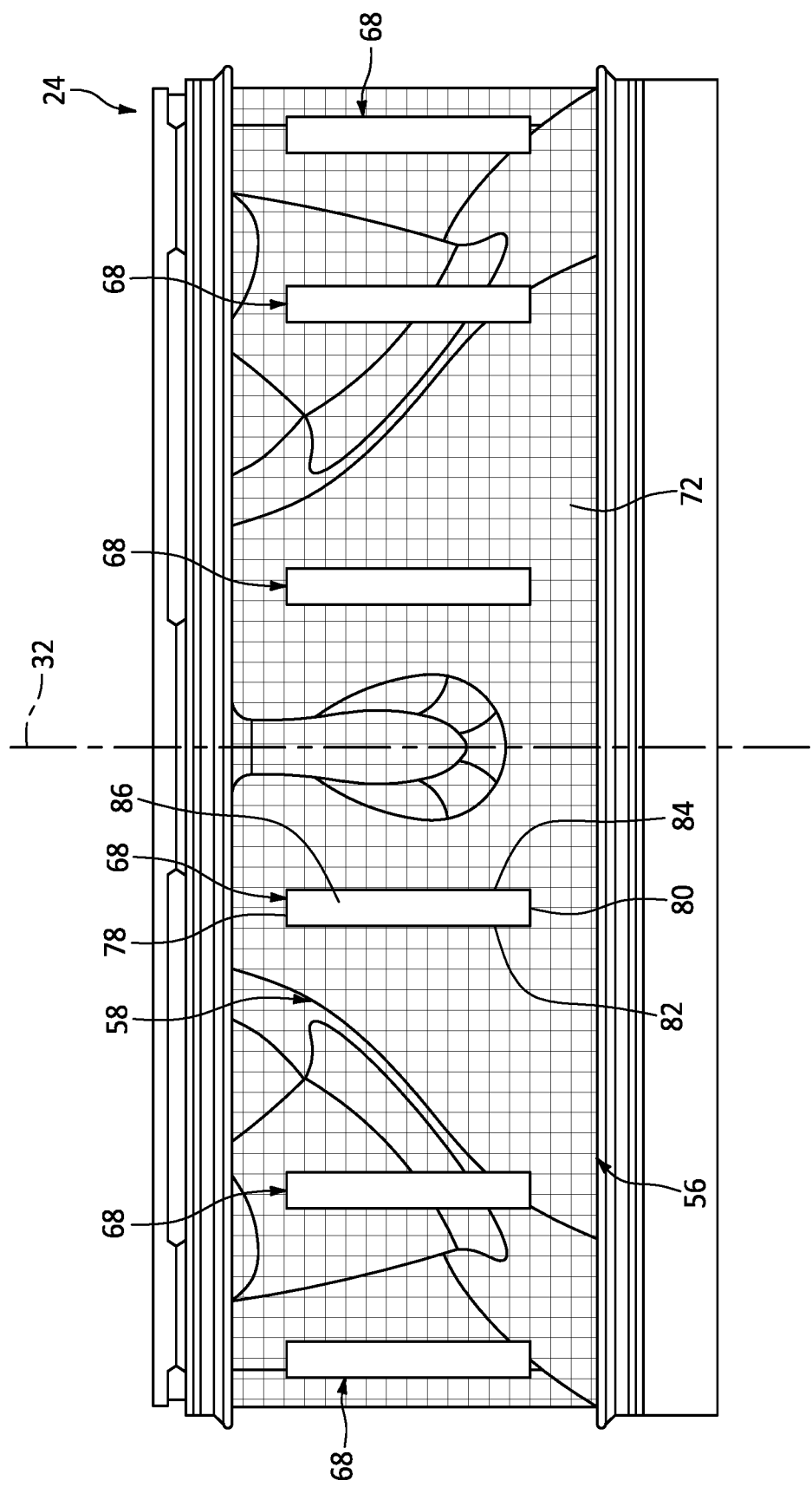
FIG. 2 is side illustration of a portion of the aircraft system at an engine inlet with an array of sensor assemblies.
Figure 3B:
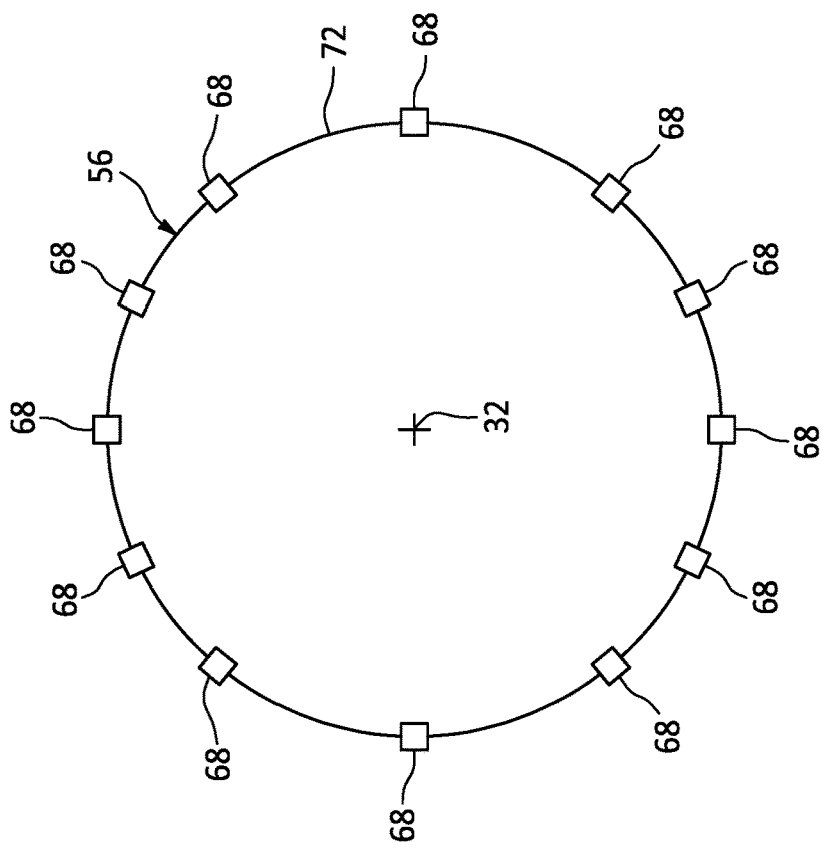
FIGS. 3A and 3B are cross-sectional schematic illustrations at the engine inlet with various arrangements of the sensor assemblies.
Figure 3A:
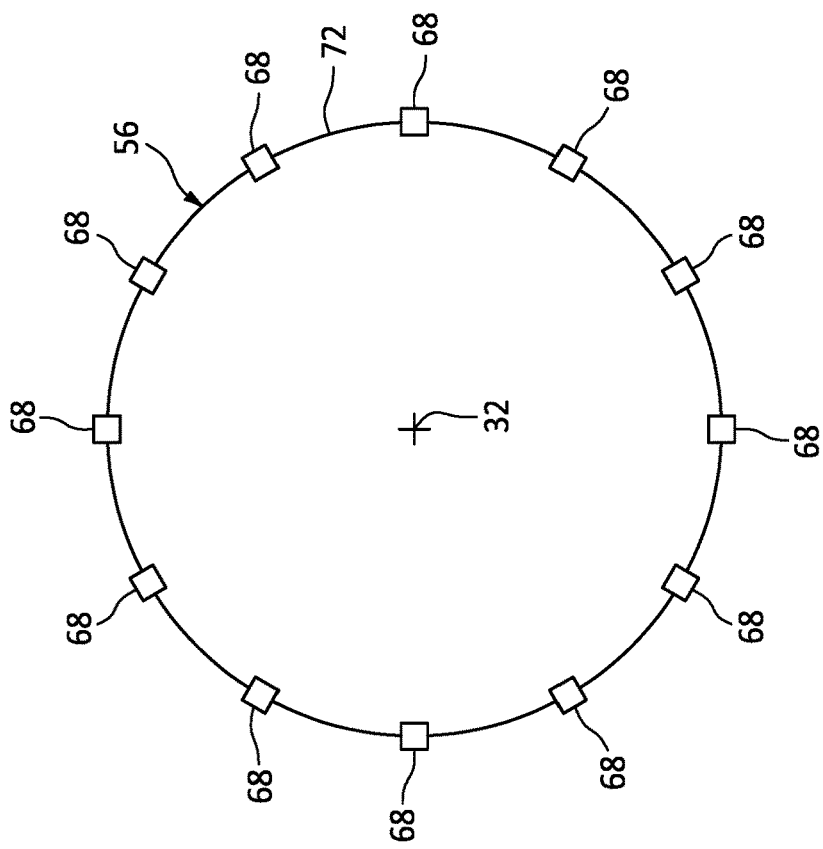

The sensor assemblies 68 may be arranged within the flowpath 58 at (e.g., on, adjacent or proximate) the engine inlet 56. The sensor assemblies 68 of FIG. 2, for example, are upstream of and mounted to a mesh screen 72 extending (e.g., axially and/or circumferentially) across the engine inlet 56 (or another portion of the flowpath 58). The sensor assemblies 68 may be distributed circumferentially about the centerline axis 32 in an annular array. Referring to FIG. 3A, this arrangement of the sensor assemblies 68 may be in a symmetric pattern; e.g., equally spaced about the centerline axis 32. Referring to FIG. 3B, the arrangement of the sensor assemblies 68 may alternatively be in an asymmetric pattern; e.g., unequally spaced about the centerline axis 32.

Figure 4:
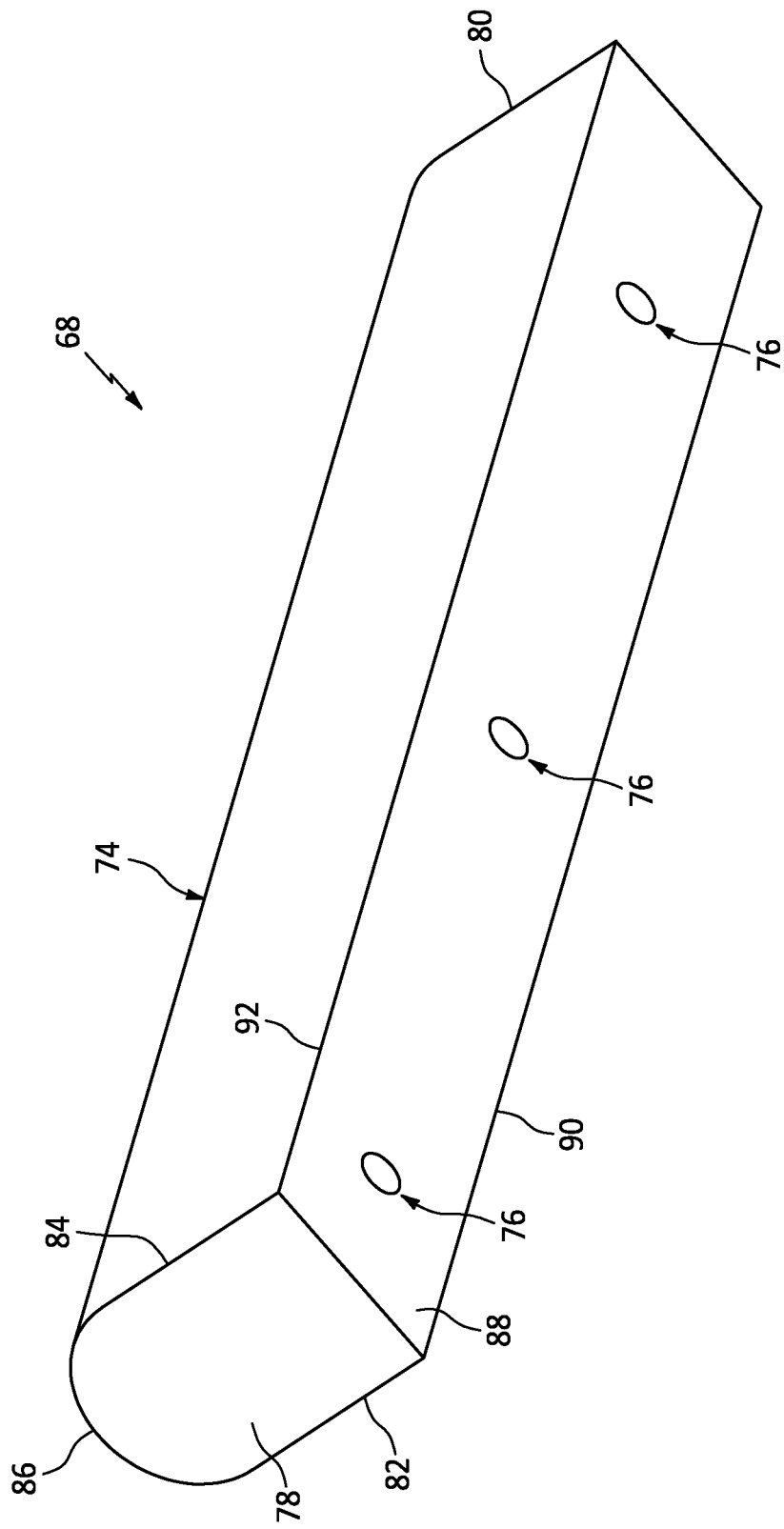
FIG. 4 is a perspective schematic illustration of one of the sensor assemblies.

Referring to FIG. 4, each sensor assembly 68 may include a sensor mount 74 and one or more static pressure sensors 76. The sensor mount 74 may be configured as an elongated instrumentation body such as, but not limited to, a rake, a strut, a rod or any other body which can provide a relatively consistent static pressure region as discussed below. The sensor mount 74 of FIG. 4, for example, extends longitudinally (e.g., in an axially direction along the centerline axis 32 of FIG. 2) between and to a first end 78 of the sensor mount 74 and a second end 80 of the sensor mount 74. The sensor mount 74 extends laterally (e.g., in a circumferential direction about the centerline axis 32 of FIG. 2) between and to a first side 82 of the sensor mount 74 and a second side 84 of the sensor mount 74. The sensor mount 74 extends vertically (e.g., in a radial direction relative to the centerline axis 32) between and to an upstream, leading edge 86 of the sensor mount 74 and a downstream, trailing bluff end 88 of the sensor mount 74.

Figure 5:
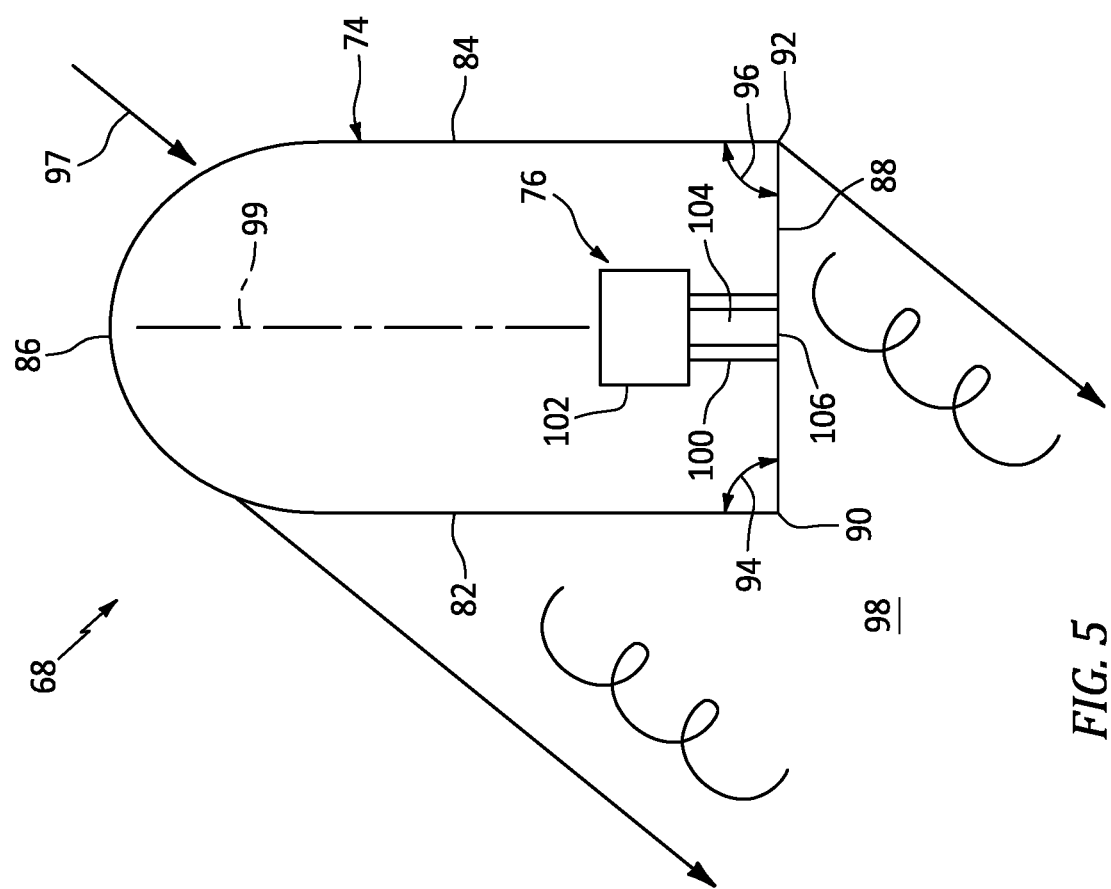
FIG. 5 is a cross-sectional schematic illustration of one of the sensor assemblies.

Referring to FIG. 5, the mount first side 82 and the mount second side 84 may laterally taper as the mount sides 82 and 84 project vertically (e.g., radially outward) to the mount leading edge 86. The mount first side 82 and the mount second side 84 may meet at the mount leading edge 86. The sensor mount 74, for example, may have a tapered (e.g., arcuate, curved, pointed, etc.) cross-sectional geometry at the mount leading edge 86 when viewed, for example, in a reference plane perpendicular to the centerline axis 32; e.g., plane of FIG. 5. The sensor mount 74, however, is not limited to including such a tapered geometry at its mount leading edge 86. For example, in other embodiments, the mount leading edge 86 may be configured as another bluff end of the sensor mount 74; e.g., similar to but positioned opposite the mount bluff end 88.

The mount first side 82 may meet the mount bluff end 88 at a first (e.g., sharp) corner 90 and the mount second side 84 may meet the mount bluff end 88 at a second (e.g., sharp) corner 92. At the first corner 90, the mount bluff end 88 is angularly offset from the mount first side 82 by a first angle 94. This first angle 94 may be between, for example, seventy degrees(70°) and one-hundred and ten degrees (110°); e.g., ninety degrees (90°). At the second corner 92, the mount bluff end 88 is angularly offset from the mount second side 84 by a second angle 96. This second angle 96 may be between, for example, seventy degrees(70°) and one-hundred and ten degrees (110°); e.g., ninety degrees (90°). The sensor mount 74 at the mount bluff end 88 may have a straight sectional geometry when viewed, for example, in the reference plane. With this arrangement, the sensor mount 74 is configured to promote boundary airflow separation at the mount bluff end 88. This airflow separation may occur across a relatively wide range of angles of incidence between a direction of the incoming airflow 97 and a chord 99 of the sensor mount 74. Thus, even as the airflow direction may change during gas turbine engine operation, the sensor mount 74 may facilitate airflow separation.

Referring to FIG. 4, the static pressure sensors 76 are arranged with the respective sensor mount 74 at its mount bluff end 88 where airflow has separated to provide a relatively consistent static pressure region 98 (see FIG. 5). The static pressure sensors 76 of FIG. 4, for example, are arranged in a longitudinally extending linear array along the mount bluff end 88. The static pressure sensors 76 may be evenly or unevenly spaced within the array along the respective sensor mount 74. Each of the static pressure sensors 76 is mounted to the respective sensor mount 74 at its mount bluff end 88.

Referring to FIG. 5, each of the static pressure sensors 76 may include a pressure port 100 (e.g., a tube) paired with and leading to a static pressure sensor element 102; e.g., a pressure transducer. The pressure port 100 provides a passage 104 for the air to diffuse or otherwise flow from the mount bluff end 88 to the pressure sensor element 102. Examples of the pressure sensor element 102 include, but are not limited to, a piezoresistive strain gauge, a capacitive sensor element, and an electromagnetic sensor element.

Figure 6A:
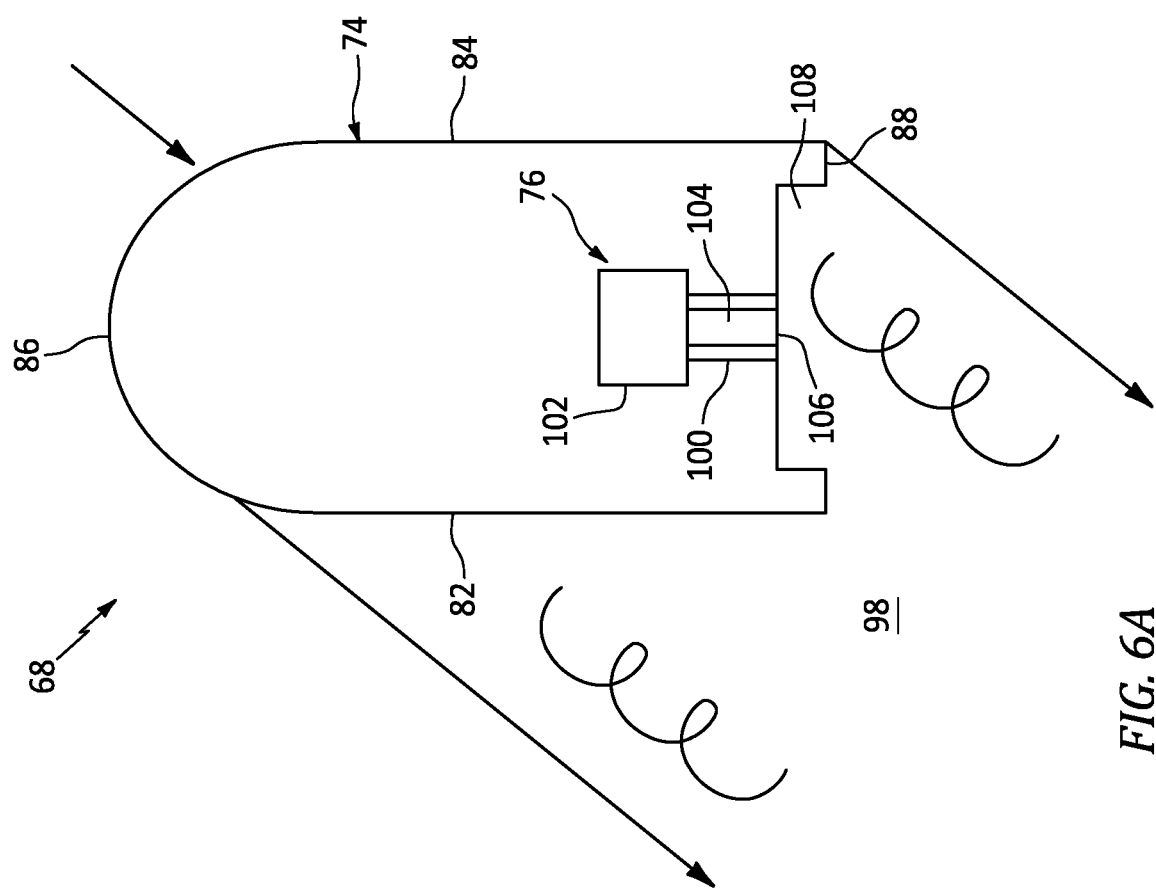
FIGS. 6A and 6B are cross-sectional schematic illustrations of one of the sensor assemblies with various bluff end arrangements.
Figure 6B:
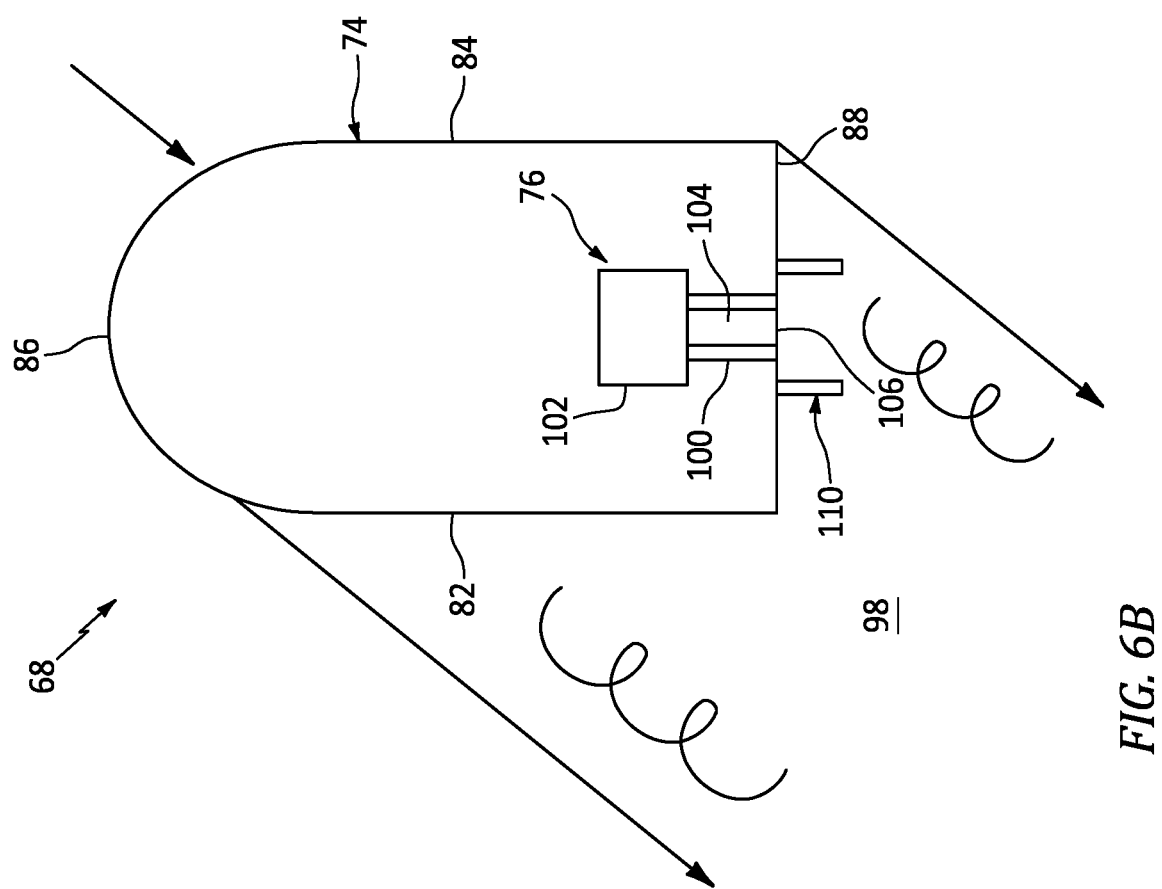

Each static pressure sensor 76 and, more particularly, an inlet opening 106 to its pressure port 100 may be disposed in the mount bluff end 88. Alternatively, referring to FIGS. 6A and 6B, each static pressure sensor 76 and its pressure port opening 106 may be recessed vertically into the respective sensor mount 74. For example, referring to FIG. 6A, the static pressure sensor 76 and its pressure port opening 106 may be disposed in a recession 108 (e.g., a pocket, a channel, a dimple, etc.) in the mount bluff end 88. In another example, referring to FIG. 6B, the static pressure sensor 76 and its pressure port opening 106 may be arranged with a flow deflector 110. The flow deflector 110 of FIG. 6B forms a rim about the static pressure sensor 76 and its pressure port opening 106 to further promote airflow separation from the sensor mount 74 at the mount bluff end 88.

The processing system 70 of FIG. 1 is in signal communication (e.g., hardwired and/or wirelessly coupled) with the static pressure sensors 76 (see FIGS. 4 and 5). The processing system 70 may be implemented with a combination of hardware and software. The hardware may include at least one processing device 112 and a memory 114, where the processing device 112 may include one or more single-core and/or multi-core processors. The hardware may also or alternatively include analog and/or digital circuitry other than that described above.

The memory 114 is configured to store software (e.g., program instructions) for execution by the processing device 112, which software execution may control and/or facilitate performance of one or more operations such as those described herein. The memory 114 may be a non-transitory computer readable medium. For example, the memory 114 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 7:
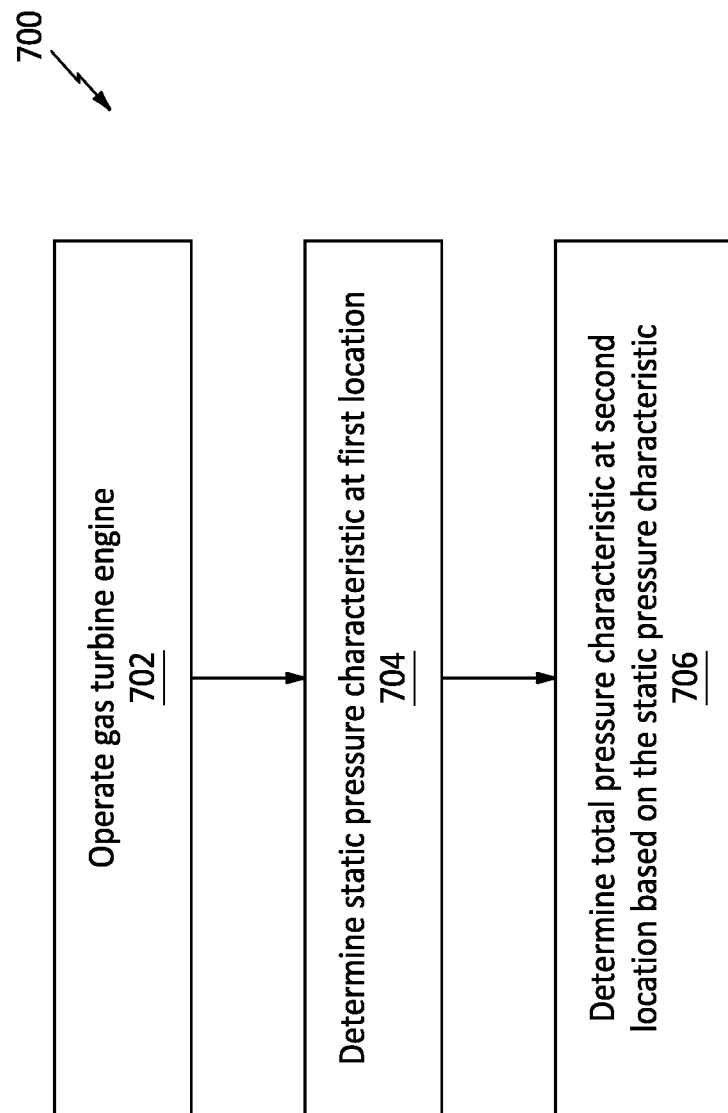
FIG. 7 is a flow diagram of a method for monitoring a gas turbine engine.

FIG. 7 is a flow diagram of a method 700 for monitoring a gas turbine engine. For ease of description, the monitoring method 700 is described herein with reference to the aircraft system 20 of FIG. 1 and its gas turbine engine 24. The operating method 700 of the present disclosure, however, is not limited to such an exemplary aircraft system.

In step 702, the gas turbine engine 24 is operated. The gas turbine engine 24, for example, may be operated at low power, intermediate power or high power. This gas turbine engine operation may be steady state operation. Alternatively, the gas turbine engine operation may be transient; e.g., as the gas turbine engine 24 is powering (e.g., spooling) up or down. During the gas turbine engine operation, the gas turbine engine 24 may be arranged with (e.g., mounted to) the aircraft while the aircraft is on the ground. Alternatively, the gas turbine engine 24 may be arranged (e.g., discrete from the aircraft) in a test cell with a controlled environment, or otherwise.

In step 704, a static pressure characteristic is determined for the air flowing through the flowpath 58. This static pressure characteristic may be indicative of a static pressure distribution/a static pressure distortion (e.g., circumferentially and/or axially) across the flowpath 58 at a first location; e.g., the engine inlet 56, the screen 72, etc. The static pressure sensors 76, for example, may sense and measure a static pressure of the air within the flowpath 58 at the engine inlet 56. The static pressure sensors 76 may then communicate sensor data to the processing system 70 indicative of the sensed and measured static pressures. The processing system 70 may process this sensor data to correlate the measured static pressures to the locations of the static pressure sensors 76 within the flowpath 58. The processing system 70 may thereby map the measured static pressures (e.g., circumferentially and/or axially) across the flowpath 58, which thereby maps the static pressure distribution/the static pressure distortion (e.g., circumferentially and/or axially) across the flowpath 58.

In step 706, a total pressure characteristic is determined for the air flowing through the flowpath 58. This total pressure characteristic may be indicative of a total pressure distribution/a total pressure distortion (e.g., circumferentially and/or radially) across the flowpath 58 at a second location downstream of the first location; e.g., an upstream end of the compressor section 34, the compressor rotor face 66, etc. The processing system 70, for example, processes the static pressure characteristic (or data derived therefrom) to determine the total pressure characteristic. The processing system 70 may use a correlation factor (e.g., a distortion index) which relates the static pressure distribution/the static pressure distortion across the flowpath 58 at the first location to the total pressure distribution/the total pressure distortion across the flowpath 58 at the second location, for example, for a particular set of gas turbine engine operating conditions, parameters, etc. The correlation factor may be predetermined using a computational fluid dynamics (CFD) analysis of flow through the flowpath 58 from the engine inlet 56 to the compressor section 34. The correlation factor may also or alternatively be predetermined using a test rig during a previous test or tests of the gas turbine engine 24.

An example of the correlation factor is a DC60 distortion index. This distortion index may be defined to calculate distortion of the static pressure over a sixty degree(60°) sector of the flowpath 58 at the first location; e.g., a sixty degree section of the engine inlet 56/the screen 72. The distortion index may be expressed as DC60(Ps), which stands for distortion coefficient of static pressure over a sixty degrees sector. The following formula may be used to determine the DC60(Ps):

$$DC60(Ps) = \frac{\text{abs}(P_{s(worst\ over\ 60°\ sector)} - P_{s,average\ over\ 36\ probes})}{P_{s,average\ over\ 36\ probes}}.$$

The $P_{s(worst\ over\ 60°\ sector)}$ is a worst (from a delta standpoint) static pressure over a sixty degree sector of the flowpath 58 at the first location (calculated from the static pressure sensor(s) 76 in the respective sixty degree sector). The $P_{s,average\ over\ 36\ probes}$ is an arithmetic average static pressure over all of the static pressure sensors 76. DC60(Ps) may be compared to the DC60 at the second location. Using the correlation factor, the DC60 at the second location can be determined (e.g., estimated, modeled, etc.). Of course, various other distortion indices may alternatively be used for, for example, a ten degree(10°) sector, a fifteen degree(15°) sector, a thirty degree(30°) sector, a forty-five degree(45°) sector, a ninety degree (90°) sector, etc.

The airflow through the engine inlet 56/the screen 72 at the first location is, in general, expected to follow a substantially radial inward trajectory. However, under certain conditions and/or with certain flowpath arrangements, the airflow trajectory may change and also have a significant axial and/or circumferential component. Such a change may be detrimental to use of a total pressure sensor array as a typical total pressure sensor may (e.g., only) be tolerant to a relatively small range of airflow incidence angles; e.g., less than +/−thirty degrees. By contrast, each sensor mount 74 may facilitate flow separation at the mount bluff end 88 for a relatively wide range of airflow incidence angles; e.g., +/−thirty, forty, fifty degrees or more. The sensor mounts 74 may thereby maintain the static pressure sensors 76 in zones of relatively consistent static pressure even as the airflow trajectory may change during gas turbine engine operation. The sensor system 28 and the monitoring method 700 of the present disclosure may thereby provide accurate total pressure distortion measurements even where environmental conditions are not tightly controlled; e.g., even during "real world" operating conditions where the gas turbine engine 24 is on aircraft. Moreover, the static pressure sensors 76 may not require calibration for specific airflow incidence angles as may be required for total pressure sensors.

The sensor assemblies 68 may be positioned upstream of the screen 72 such that even in an unlikely event of a sensor assembly malfunction, no parts from the sensor assembly 68 may be ingested into the gas turbine engine 24. The present disclosure, however, is not limited to such an exemplary arrangement nor to a gas turbine engine with a filter screen at its engine inlet 56. Furthermore, where the gas turbine engine 24 does include the screen 72, the screen 72 may have various geometries; e.g., flat, domed, conical, etc.

Figure 8:
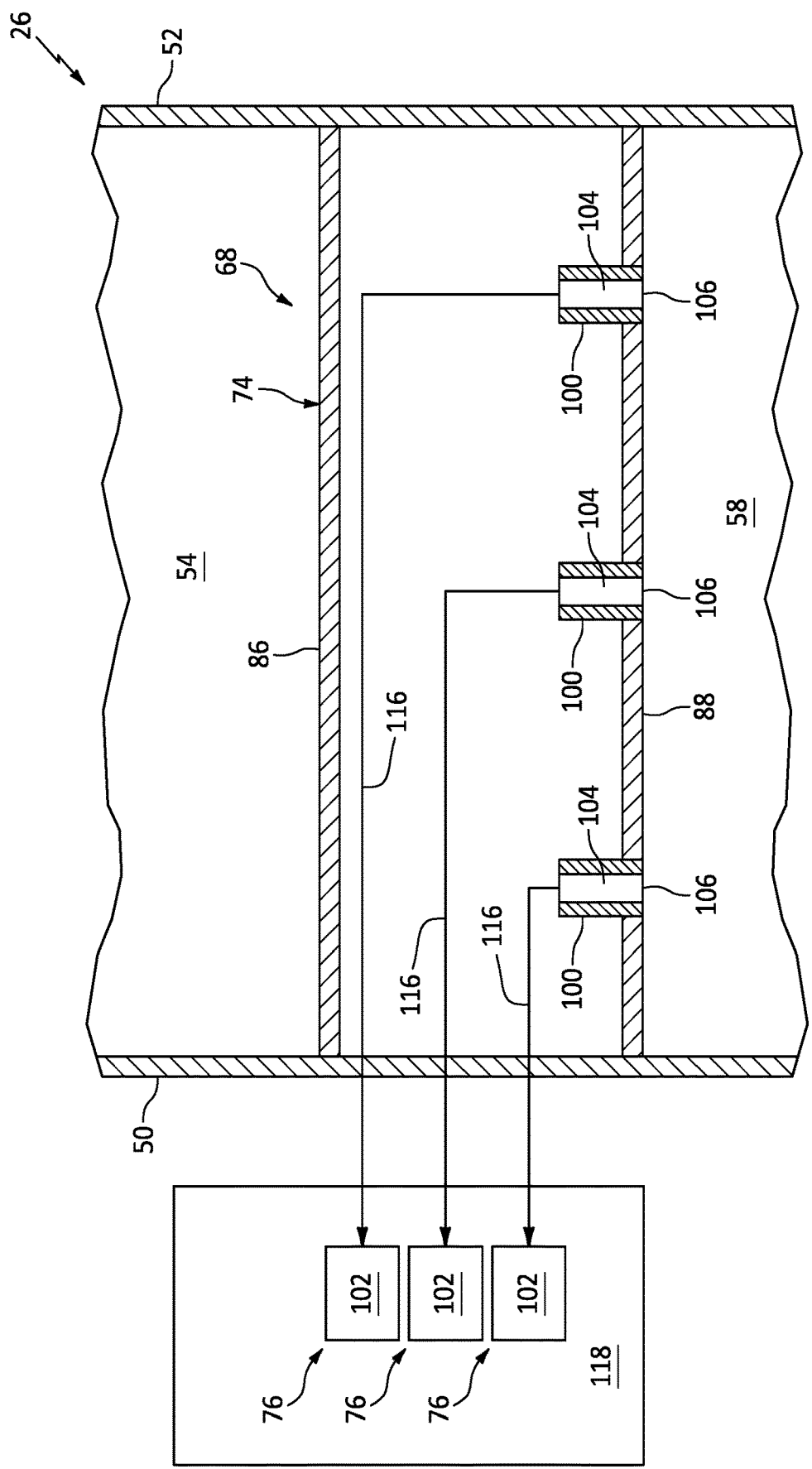
FIG. 8 is a side schematic illustration of the aircraft system at the engine inlet arranged with remote static pressure sensor elements.

The static pressure sensors 76 are described above as being housed within the respective sensor mounts 74. One or more of the static pressure sensors 76, however, may alternatively be arranged partially remote from its respective sensor mount 74 and/or the flowpath 58. For example, referring to FIG. 8, one or more of the pressure ports 100 may be extended via pressure lines 116 (e.g., tubing) such that the static pressure sensor elements 102 may be located outside of the sensor mount 74 and the flowpath 58. The static pressure sensor elements 102 may thereby be part of a pressure scanner in an engine compartment 118 outside of the flowpath 58.

The sensor system 28 may be included in various gas turbine engines other than the one described above. The sensor system 28, for example, may be included in a geared gas turbine engine where a gear train connects one or more shafts to one or more rotors in a fan section, a compressor section and/or any other engine section. Alternatively, the sensor system 28 may be included in a gas turbine engine configured without a gear train. The sensor system 28 may be included in a gas turbine engine configured with a single rotating structure (e.g., spool) or with two or more rotating structures (e.g., spools). The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:
a gas turbine engine including an inlet and a compressor section, a flowpath projecting radially inward into the gas turbine engine from the inlet and extending through the compressor section; and
a sensor system comprising a plurality of static pressure sensors at least partially within the flowpath, the sensor system configured to determine a total pressure characteristic within the flowpath using the plurality of static pressure sensors;
wherein the sensor system is further configured to
determine a static pressure characteristic at a first location within the flowpath using the plurality of static pressure sensors; and
process the static pressure characteristic to determine the total pressure characteristic at a second location within the flowpath that is downstream of the first location.

2. The system of claim 1, wherein the total pressure characteristic is indicative of a total pressure distortion across the flowpath.

3. The system of claim 1, wherein the total pressure characteristic is determined for a location at an upstream end of the compressor section.

4. The system of claim 1, wherein the total pressure characteristic is determined for a location at a face of a compressor rotor within the compressor section.

5. The system of claim 1, wherein
the static pressure characteristic is indicative of a static pressure distortion across the flowpath at the first location; and
the total pressure characteristic is indicative of a total pressure distortion across the flowpath at the second location.

6. The system of claim 1, wherein the sensor system is configured to process the static pressure characteristic using a correlation factor to determine the total pressure characteristic.

7. The system of claim 1, wherein
the first location is at the inlet; and
the second location is at the compressor section.

8. The system of claim 1, wherein the plurality of static pressure sensors are located along a screen across the flowpath.

9. The system of claim 1, wherein a first of the plurality of static pressure sensors comprises a pressure port with an inlet opening that faces radially inwards and away from incoming flow.

10. The system of claim 1, wherein
the sensor system comprises a sensor mount with a downstream bluff end; and
one or more of the plurality of static pressure sensors are attached to the sensor mount at the downstream bluff end.

11. The system of claim 10, wherein
the sensor mount extends laterally between a first side and a second side;
the first side meets the downstream bluff end at a first corner; and
the second side meets the downstream bluff end at a second corner.

12. The system of claim 10, wherein the downstream bluff end is configured with a straight sectional geometry.

13. The system of claim 10, wherein each of the one or more of the plurality of static pressure sensors is recessed into the sensor mount from the downstream bluff end.

14. The system of claim 1, wherein the plurality of static pressure sensors are arranged in a symmetric pattern within the flowpath.

15. The system of claim 1, wherein the plurality of static pressure sensors are arranged in an asymmetric pattern within the flowpath.

16. A system for an aircraft, comprising:
a gas turbine engine including an inlet and a compressor section, a flowpath projecting into the gas turbine engine from the inlet and extending through the compressor section;
a screen extending across the flowpath at the inlet; and
a sensor system comprising a plurality of static pressure sensors arranged with and upstream of the screen, the sensor system configured to
determine a static pressure characteristic at a first location within the flowpath using the plurality of static pressure sensors; and process the static pressure characteristic to determine the total pressure characteristic at a second location within the flowpath that is downstream of the first location.

17. The system of claim 16, wherein the gas turbine engine comprises one of a turboshaft gas turbine engine or a turboprop gas turbine engine.

18. A method for monitoring a gas turbine engine, comprising:
   providing a plurality of static pressure sensors at least partially within a flowpath, the flowpath projecting radially inward into the gas turbine engine from an inlet to the gas turbine engine, and the flowpath extending through a compressor section of the gas turbine engine;
   determining a static pressure characteristic at a first location within the flowpath using the plurality of static pressure sensors; and
   processing the static pressure characteristic to determine a total pressure characteristic within the flowpath at a second location within the flowpath that is downstream of the first location.

19. The method of claim 18, wherein the plurality of pressure sensors are arranged with a screen extending across the flowpath at the inlet.

* * * * *